United States Patent [19]

Massie

[11] 3,960,999

[45] June 1, 1976

[54] METHOD OF PRODUCING REINFORCED FOAMED STRUCTURES

[75] Inventor: Stephen N. Massie, Palatine, Ill.

[73] Assignee: Universal Oil Products Company, Des Plaines, Ill.

[22] Filed: Nov. 11, 1974

[21] Appl. No.: 522,673

[52] U.S. Cl. .............................. 264/45.3; 264/46.4; 264/46.7; 428/133; 428/239; 428/256; 428/313; 428/314
[51] Int. Cl.² .......................................... B29D 27/04
[58] Field of Search........... 264/45.3, DIG. 17, 45.1, 264/46.4–46.7, 45.8, 46.2; 428/133, 236, 239, 256, 313, 314

[56] References Cited
UNITED STATES PATENTS

| | | | |
|---|---|---|---|
| 73,139 | 1/1868 | Towers | 428/236 |
| 95,776 | 10/1869 | Crossley | 428/236 X |
| 1,503,337 | 7/1924 | Seigle | 428/239 X |
| 2,017,106 | 10/1935 | Sandell | 428/256 X |
| 2,362,786 | 11/1944 | Williams | 428/256 X |
| 2,364,289 | 12/1944 | Hale | 428/256 X |
| 2,943,010 | 6/1960 | Stefl et al | 428/239 |
| 3,382,302 | 5/1968 | Marzocchi | 264/45.3 |
| 3,660,215 | 5/1972 | Pawlicki | 428/256 X |
| 3,867,494 | 2/1975 | Rood et al. | 264/46.7 |

FOREIGN PATENTS OR APPLICATIONS

| | | | |
|---|---|---|---|
| 606,181 | 1960 | Canada | 264/46.7 |

*Primary Examiner*—Philip Anderson
*Attorney, Agent, or Firm*—James R. Hoatson, Jr.; Barry L. Clark; William H. Page, II

[57] ABSTRACT

Foamed structures such as those formed of rigid polyurethane can be easily reinforced by a plurality of layers of reinforcement material spaced relatively uniformly throughout their thickness by coating or covering the layers of reinforcement material with absorbent material such as paper, stacking the layers at the bottom of a mold, adding the liquid resin, and curing the resin after it has had sufficient time to wet the absorbent layers. As the resin on the absorbent layers foams, the layers of reinforcement will be simultaneously lifted and spaced from each other to provide uniform reinforcement without the need for special molds or the labor usually required to position spaced layers of reinforcement.

6 Claims, 8 Drawing Figures

METHOD OF PRODUCING REINFORCED FOAMED STRUCTURES

BACKGROUND OF THE INVENTION

The invention relates to foamed structures and particularly to reinforcing such structures with spaced reinforcement elements. Conventionally, as shown in U.S. Pat. No. 3,382,302, for example, foamed structures are reinforced by pre-positioning the reinforcement material in the mold prior to the foaming operation. Such prepositioning is not only time consuming but expensive from the standpoint of mold cost also, where the mold must be specially fabricated to accommodate the pre-positioned reinforcements in their final positions. A great savings in labor and mold costs could obviously be made if the reinforcements did not have to be prepositioned in the mold and it is the object of the present invention to provide a method of molding which permits a plurality of layers of reinforcements to be merely stacked in the bottom of the mold.

SUMMARY

The present invention relates to a method by which reinforcing materials such as glass, metal wire, metal ribbon and other materials may be randomly arranged in a foamed resinous object to impart additional strength above that which is available from the foamed resinous material alone. By the method of the invention, the material to be used for reinforcement is sandwiched between two layers of absorbent paper or is otherwise surrounded with an absorbent coating. The layers of absorbent covered reinforcement material are then laid on top of each other in the bottom of the mold cavity and a quantity of liquid resin sufficient to produce the desired foamed object is added to the mold. The liquid resin is allowed to stand in contact with the layers of absorbent covered reinforcement material until the absorbent material is well wetted and has absorbed substantially as much of the resin as is possible. The resin is then cured by a catalyst in the resin, heat, or other means to cause it to foam and move upwardly to fill the mold. Since the absorbent material on the layers of reinforcements is saturated with resin, the reinforcements will be automatically lifted in the mold as the resin foams and will become spaced apart. The number of layers required to achieve a predetermined, relatively uniform spacing of the reinforcements depends on the thickness of the coated reinforcements and the amount of resin which they can absorb.

DESCRIPTION OF THE INVENTION

Figure 1:
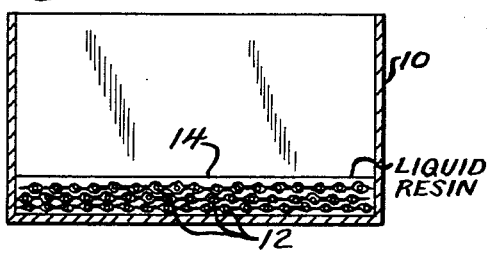
FIG. 1 is a schematic side elevation showing the relationship of several layers of reinforcements and liquid resin in a mold before foaming takes place.
Figure 2:
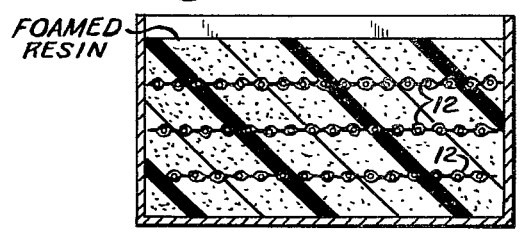
FIG. 2 is a view similar to FIG. 1 except that it shows the relationship of the reinforcements after foaming has taken place.
Figure 3:
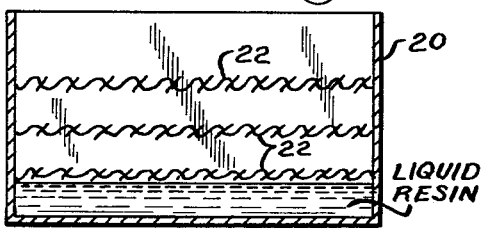
FIG. 3 is a view similar to FIG. 1 but showing a prior art arrangement in which the reinforcements are prepositioned in the mold above the liquid resin to be foamed.
Figure 4:
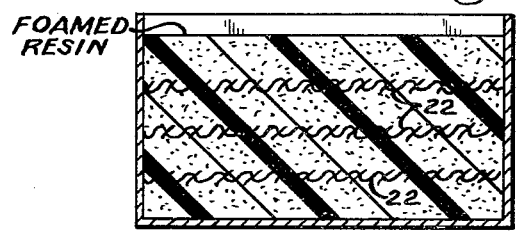
FIG. 4 is a view similar to FIG. 3 except that it shows the relationship of the prior art reinforcements after foaming.

The advantages of my improved reinforcing process can be readily seen by comparing the process illustrated in FIGS. 1 and 2 to the prior art process illustrated in FIGS. 3 and 4.

Referring to FIG. 1, a mold 10 has a plurality of layers of absorbent covered reinforcing material 12 loosely placed on its bottom. A quantity of liquid resin 14, such as a mixture of tolylene diisocyanate, a polyol, a blowing agent such as tri-fluoromethane, and a catalyst, is then placed in the mold 10. Since it is desirable that the liquid resin thoroughly wet the absorbent covering on the reinforcing material 12, the particular mixture of reagents used should be selected so that sufficient wetting time will be available before foaming commences. Depending on the number of reinforcement layers 12 which are used, the thickness and absorbency of their coverings, and the mixture of reagents used, the layers 12 will move upward from the bottom of the mold 10 by varying amounts as the resin 14 foams, as shown in FIG. 2.

In a prior art process of reinforcing polyurethane foam as shown in FIGS. 3 and 4, a mold 20 has plural layers of reinforcement 22 such as glass fiber fabric which are mounted at spaced vertical points on its side walls above the level of liquid resin 24 before the resin is added. Although the position of the prior art reinforcement layers 22 in the final foamed structure does not change during foaming, as can be seen in FIG. 4, it is obvious that more labor is consumed in positioning these layers than in positioning layers 12 in FIG. 1. Furthermore, the prior art mold 20 would require anchoring means to hold the spaced layers 22 and would thus be more expensive than mold 10 in FIG. 1.

Figure 5:
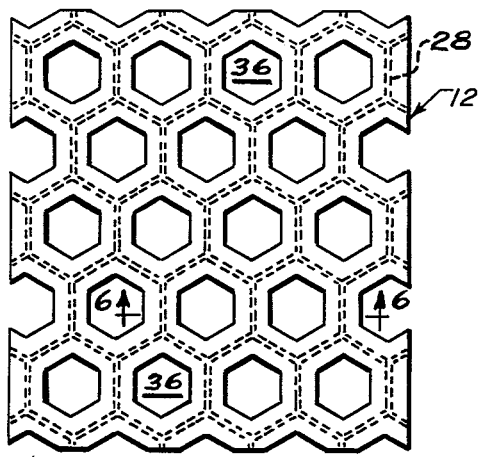
FIG. 5 is a fragmentary plan view of one form of an integral layer of paper covered reinforcing material which can be used in my process.

FIG. 5 illustrates one of many forms which the absorbent covered reinforcement layer 12 can take. In this embodiment, reinforcing material such as chicken wire 28 is covered by an upper layer of paper 30 and a lower layer of paper 32. The paper layers 30,32 are preferably formed so as to extend just a short distance from any portion of the metal 28 in the plane of the layer 12, so as to define plural open areas 36 within the layer 12. The open areas 36 not only permit rapid access of the liquid resin 14 to the layers 12 when the resin is first poured in the mold but also strengthen the final structure since they permit portions of the foamed resin to maintan an uninterrupted bond between opposite sides of the layers of reinforcement 12, The paper layers 30,32 can be joined together with adhesive or embossed so as to mechanically bond to each other. By selective embossment, the layers of paper can also have their effective overall thickness increased so as to permit more liquid resin to be positioned between the planes of the adjacent layers 12 in FIG. 1. Naturally, the more resin between layers, the greater the separation of the layers during foaming.

Figure 7:
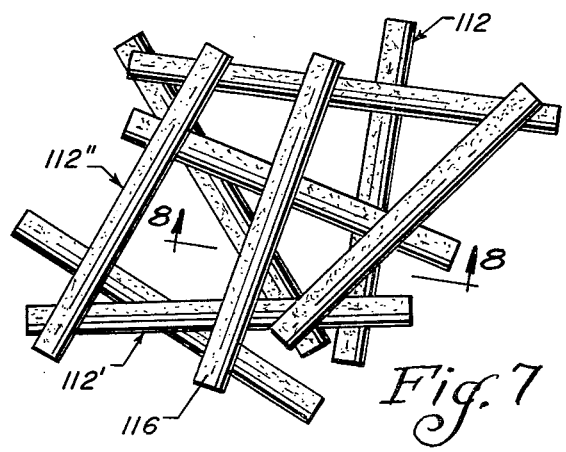
FIG. 7 is a fragmentary plan view showing a plurality of layers of reinforcement formed of individual members coated with absorbent material.
Figure 6:
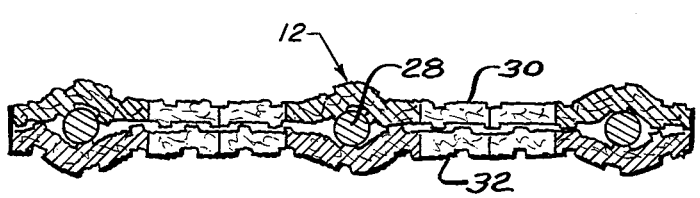
FIG. 6 is a sectional side view taken on line 6—6 of FIG. 5 and enlarged for clarity.
Figure 8:
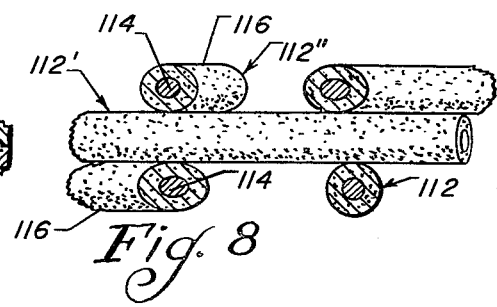
FIG. 8 is a sectional side view taken on line 8—8 of FIG. 7 and enlarged for clarity.

FIGS. 7 and 8 illustrate an alternative embodiment wherein a plurality of vertically spaced reinforcing layers 112,112' and 112'' are formed by randomly stacking single pieces of reinforcement members 114 made of materials such as wire, glass or ceramic which are coated with an absorbent coating 116 such as pulverized paper in a binder.

I claim as my invention:

1. Method of producing a foamed thermosetting resinous structure having a plurality of layers of spaced reinforcement material positioned within its thickness comprising the steps of:
   providing mesh-like reinforcement material;
   covering the mesh-like reinforcement material with an absorbent covering material capable of absorbing the resin used to form the foamed structure so as to define a plurality of openings through the covered reinforcement material;
   placing a plurality of layers of said absorbent covered reinforcement material in the bottom of a mold, the reinforcement material in each of said layers being positioned so that a liquid resin composition may pass through said openings;
   adding sufficient quantity of a foamable liquid thermosetting resin composition to the mold for forming the desired foamed thermosetting resin structure;
   allowing sufficient time for the absorbent covering material to become completely wetted by said liquid resin composition material; and
   foaming and curing said liquid resin composition in the mold to cause it to lift said layers of reinforcement material and cause them to move away from each other and become embedded in spaced apart relationship in the foamed thermosetting resin structure.

2. The method of claim 1 wherein the absorbent covering material in each of said layers is limited to an area closely adjacent to said mesh-like reinforcement material so as to define openings through the layers through which resin may freely pass.

3. The method of claim 1 wherein the absorbent covering material in each layer is embossed so that the overall thickness dimension of each layer is greater than the average thickness of the absorbent reinforcing material and the reinforcing material before embossing.

4. The method of claim 2 wherein said absorbent covering material is formed of paper.

5. Method of producing a foamed thermosetting resinous structure having a plurality of layers of spaced reinforcement material positioned within its thickness comprising the steps of:
   providing a plurality of elongated, rigid reinforcement members;
   covering said reinforcement members with an absorbent covering material capable of absorbing the resin used to form the foamed structure;
   placing a plurality of said reinforcement members in a mold so as to form a plurality of layers of said absorbent covered reinforcement members in the bottom of said mold, the reinforcement members in each of said layers being positioned so as to define openings through the layers through which resin can pass;
   adding sufficient quantity of a foamable liquid thermosetting resin compositon to the mold for forming the desired foamed thermosetting resin structure;
   allowing sufficient time for the absorbent covering members to become completely wetted by said liquid resin composition; and
   foaming and curing said liquid resin composition in the mold to cause it to lift said layers of reinforcement members and cause them to move away from each other and become embedded in spaced apart relationship in the foamed thermosetting resin structure.

6. The method of claim 5 wherein said absorbent covering material is formed of paper.

* * * * *